US012380552B2

(12) United States Patent
Ochiai

(10) Patent No.: US 12,380,552 B2
(45) Date of Patent: Aug. 5, 2025

(54) APPARATUS FOR INSPECTING DEFECT OF PRINTED MATERIAL, METHOD, AND STORAGE MEDIUM

(71) Applicant: CANON KABUSHIKI KAISHA, Tokyo (JP)

(72) Inventor: Tsubasa Ochiai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 369 days.

(21) Appl. No.: 17/707,670

(22) Filed: Mar. 29, 2022

(65) Prior Publication Data

US 2022/0318976 A1 Oct. 6, 2022

(30) Foreign Application Priority Data

Mar. 31, 2021 (JP) ................................ 2021-061103

(51) Int. Cl.
*G06T 7/00* (2017.01)

(52) U.S. Cl.
CPC .... *G06T 7/001* (2013.01); *G06T 2207/10008* (2013.01); *G06T 2207/30124* (2013.01)

(58) Field of Classification Search
CPC . G06T 2207/10008; G06T 2207/10024; G06T 2207/30124; G06T 2207/30144; G06T 2207/30176; G06T 7/001
See application file for complete search history.

(56) References Cited

U.S. PATENT DOCUMENTS

| | | | | |
|---|---|---|---|---|
| 9,064,297 | B2 | 6/2015 | Kaneko | |
| 9,507,308 | B2 | 11/2016 | Kawabe | |
| 2014/0079292 | A1* | 3/2014 | Kaneko | H04N 1/00068 382/112 |
| 2019/0070870 | A1* | 3/2019 | Janssen | B41J 13/0027 |
| 2019/0289152 | A1 | 9/2019 | Tsue | |

FOREIGN PATENT DOCUMENTS

| | | | |
|---|---|---|---|
| CN | 101799434 | A * | 8/2010 |
| JP | 2014074710 | A | 4/2014 |
| JP | 2015121635 | A | 7/2015 |
| JP | 2019158757 | A | 9/2019 |
| JP | 2019184855 | A | 10/2019 |

* cited by examiner

*Primary Examiner* — Ruiping Li
(74) *Attorney, Agent, or Firm* — ROSSI, KIMMS & McDOWELL LLP

(57) ABSTRACT

To make it possible to set an appropriate threshold value for detecting a print defect by taking into consideration an impurity included in a sheet. A lower limit value of a threshold value used for detection of a print defect is found and stored in advance. Then, whether or not a threshold value for detecting a print defect, which is set based on user instructions, is an appropriate threshold value is determined by using the lower limit value stored in advance.

20 Claims, 15 Drawing Sheets

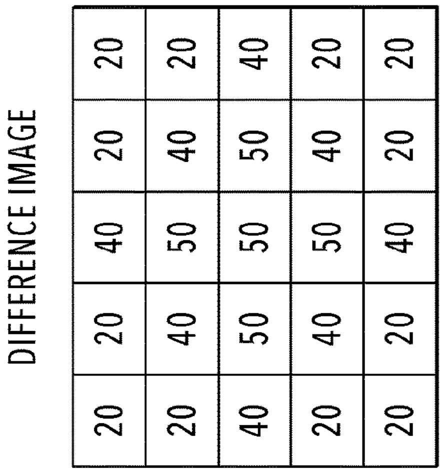

FIG.4A

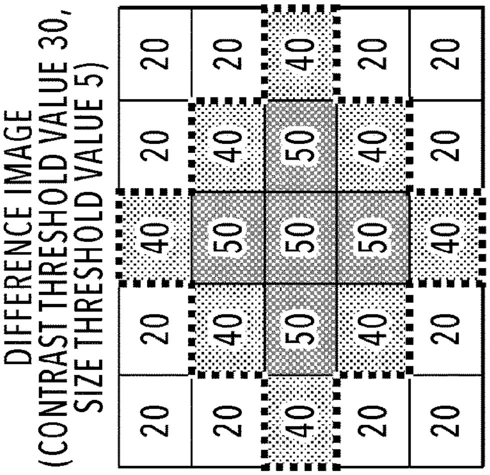

FIG.4B

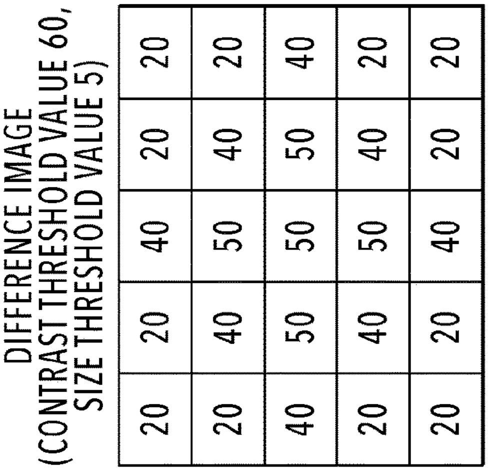

FIG.4C

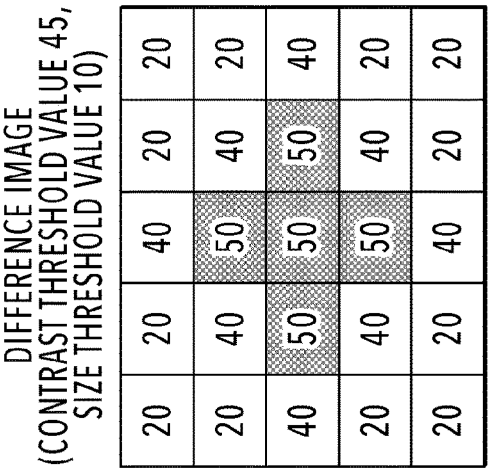

FIG.4D

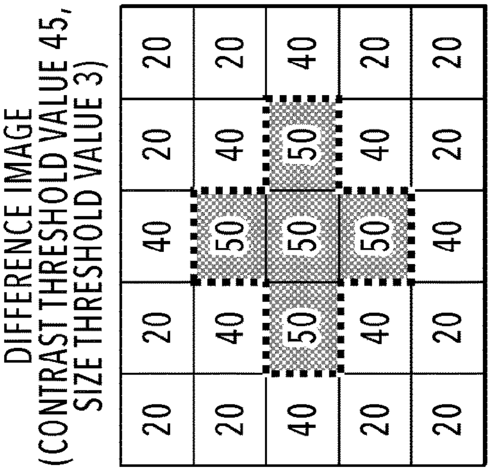

FIG.4E

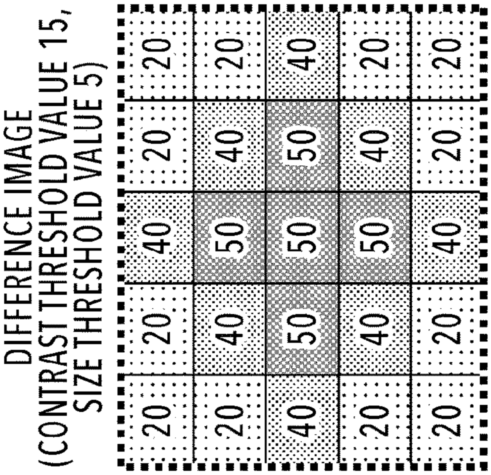

FIG.4F

FIG.4A DIFFERENCE IMAGE

| 20 | 20 | 40 | 20 | 20 |
|---|---|---|---|---|
| 20 | 40 | 50 | 40 | 20 |
| 40 | 50 | 50 | 50 | 40 |
| 20 | 40 | 50 | 40 | 20 |
| 20 | 20 | 40 | 20 | 20 |

FIG.4B DIFFERENCE IMAGE (CONTRAST THRESHOLD VALUE 30, SIZE THRESHOLD VALUE 5)

| 20 | 20 | 40 | 20 | 20 |
|---|---|---|---|---|
| 20 | 40 | 50 | 40 | 20 |
| 40 | 50 | 50 | 50 | 40 |
| 20 | 40 | 50 | 40 | 20 |
| 20 | 20 | 40 | 20 | 20 |

FIG.4C DIFFERENCE IMAGE (CONTRAST THRESHOLD VALUE 60, SIZE THRESHOLD VALUE 5)

| 20 | 20 | 40 | 20 | 20 |
|---|---|---|---|---|
| 20 | 40 | 50 | 40 | 20 |
| 40 | 50 | 50 | 50 | 40 |
| 20 | 40 | 50 | 40 | 20 |
| 20 | 20 | 40 | 20 | 20 |

FIG.4D DIFFERENCE IMAGE (CONTRAST THRESHOLD VALUE 45, SIZE THRESHOLD VALUE 10)

| 20 | 20 | 40 | 20 | 20 |
|---|---|---|---|---|
| 20 | 40 | 50 | 40 | 20 |
| 40 | 50 | 50 | 50 | 40 |
| 20 | 40 | 50 | 40 | 20 |
| 20 | 20 | 40 | 20 | 20 |

FIG.4E DIFFERENCE IMAGE (CONTRAST THRESHOLD VALUE 45, SIZE THRESHOLD VALUE 3)

| 20 | 20 | 40 | 20 | 20 |
|---|---|---|---|---|
| 20 | 40 | 50 | 40 | 20 |
| 40 | 50 | 50 | 50 | 40 |
| 20 | 40 | 50 | 40 | 20 |
| 20 | 20 | 40 | 20 | 20 |

FIG.4F DIFFERENCE IMAGE (CONTRAST THRESHOLD VALUE 15, SIZE THRESHOLD VALUE 5)

| 20 | 20 | 40 | 20 | 20 |
|---|---|---|---|---|
| 20 | 40 | 50 | 40 | 20 |
| 40 | 50 | 50 | 50 | 40 |
| 20 | 40 | 50 | 40 | 20 |
| 20 | 20 | 40 | 20 | 20 |

| SHEET TYPE | KIND OF IMPURITY | CONTRAST | MAXIMUM SIZE |
|---|---|---|---|
| ... | ... | ... | ... |
| PLAIN PAPER | SPOT | 25 | 15 |
| PLAIN PAPER | SPOT | 26 | 10 |
| ... | ... | ... | ... |
| PLAIN PAPER | SPOT | 30 | 9 |
| ... | ... | ... | ... |
| PLAIN PAPER | STREAK | 10 | 18 |
| PLAIN PAPER | STREAK | 11 | 17 |
| ... | ... | ... | ... |
| COATED PAPER | SPOT | 25 | 8 |
| COATED PAPER | SPOT | 26 | 6 |
| ... | ... | ... | ... |
| COATED PAPER | STREAK | 10 | 9 |
| COATED PAPER | STREAK | 11 | 8 |
| ... | ... | ... | ... |

FIG.6

| | SPOT | | STREAK | |
|---|---|---|---|---|
| | CONTRAST | SIZE | CONTRAST | SIZE |
| INSPECTION LEVEL 1 | 45 | 30 | 25 | 35 |
| INSPECTION LEVEL 2 | 40 | 25 | 20 | 30 |
| INSPECTION LEVEL 3 | 35 | 20 | 15 | 25 |
| INSPECTION LEVEL 4 | 30 | 15 | 10 | 20 |
| INSPECTION LEVEL 5 | 25 | 10 | 5 | 10 |

WARNING

THE INSPECTION LEVEL IS TOO HIGH.
SET A LOWER INSPECTION LEVEL OR CHANGE THE SHEET.

OK

WARNING

THE INSPECTION LEVEL FOR SPOT IS TOO HIGH.
LOWER THE INSPECTION LEVEL FOR SPOT OR CHANGE THE SHEET.

OK

| SHEET TYPE | INSPECTION FEASIBILITY INFORMATION | KIND OF IMPURITY | CONTRAST | MAXIMUM SIZE |
|---|---|---|---|---|
| ... | ... | ... | ... | ... |
| PLAIN PAPER | FEASIBLE | SPOT | 25 | 15 |
| PLAIN PAPER | FEASIBLE | SPOT | 26 | 10 |
| ... | ... | ... | ... | ... |
| PLAIN PAPER | FEASIBLE | SPOT | 30 | 9 |
| ... | ... | ... | ... | ... |
| PLAIN PAPER | FEASIBLE | STREAK | 10 | 18 |
| PLAIN PAPER | FEASIBLE | STREAK | 11 | 17 |
| ... | ... | ... | ... | ... |
| COATED PAPER | FEASIBLE | SPOT | 25 | 8 |
| COATED PAPER | FEASIBLE | SPOT | 26 | 6 |
| ... | ... | ... | ... | ... |
| COATED PAPER | FEASIBLE | STREAK | 10 | 9 |
| COATED PAPER | FEASIBLE | STREAK | 11 | 8 |
| ... | ... | ... | ... | ... |
| COLORED PAPER A | INFEASIBLE | – | – | – |
| ... | ... | ... | ... | ... |

FIG.13

WARNING

IT IS NOT POSSIBLE TO INSPECT PRINTED MATERIAL OF THIS SHEET TYPE. CHANGE THE SHEET TYPE.

OK

WARNING

IT IS NOT POSSIBLE TO INSPECT PRINTED MATERIAL OF THIS SHEET TYPE. CHANGE THE SHEET TYPE BY SELECTING FROM THE FOLLOWING.

○ PLAIN PAPER  ○ COATED PAPER

OK

APPARATUS FOR INSPECTING DEFECT OF PRINTED MATERIAL, METHOD, AND STORAGE MEDIUM

BACKGROUND OF THE INVENTION

Field of the Invention

The present disclosure relates to an inspection technique of print results.

Description of the Related Art

In the past, inspection of a printed material was performed by a person, but in recent years, a printing system is used in which an in-line type inspection apparatus capable of performing print processing while performing inspection. In the printing system such as this, first, an image that is used as a reference (called "reference image" or "correct image") at the time of inspection is registered. Next, a printed material output from a printing apparatus is read and inspection is performed by comparing the obtained read image and the correct image registered first. Then, at the time of inspection, first, position adjustment of the correct image and the read image is performed and next, the difference in the pixel value is extracted by comparing the corresponding pixels in both the images after the position adjustment, and threshold value processing to determine whether or not the extracted difference value is larger than or equal to a threshold value is performed. In a case where the results of the threshold value processing indicate that the difference value is larger than or equal to the threshold value, the pixel is detected as a defective pixel.

The threshold value used for the threshold value processing described above is important because it relates to inspection accuracy, and therefore, it is necessary for a user to set an appropriate threshold value. In this regard, a method of setting a threshold value in accordance with a defect level desired by a user by preparing a chart in which defects that occur during printing are reproduced and causing the user to select a defect level the user desires to detect from the read image has been proposed (Japanese Patent Laid-Open No. 2014-74710).

By the way, in the sheet used for printing, a minute impurity that the human eyes hardly see is included. The smaller the threshold value for detecting a print defect, the stronger the possibility is that the impurity included in the sheet is detected erroneously as a print defect. On the other hand, in a case where a too large threshold value is set in order to avoid erroneous detection, it will be no longer possible to detect a print defect that a user originally desires to detect. Further, the position, size, density and the like of the impurity included in the sheet may vary depending on the sheet type, and therefore, in the past, it was difficult to set a threshold value with which it is possible to detect a print defect without erroneously detecting the impurity included in the sheet. Even by the technique of Japanese Patent Laid-Open No. 2014-74710, the threshold value is set by focusing attention only on the defect level, and therefore, there is a case where the threshold value with which the impurity in the sheet is detected erroneously as a print defect is set as a result.

SUMMARY OF THE INVENTION

The apparatus according to the present disclosure is an apparatus for inspecting a defect of a printed material and including a storage unit configured to store a lower limit value of a threshold value used for detection of the defect; and a first determination unit configured to determine whether the threshold value set for the detection is larger than the lower limit value.

Further features of the present disclosure will become apparent from the following description of exemplary embodiments with reference to the attached drawings.

BRIEF DESCRIPTION OF THE DRAWINGS

FIG. 4A to FIG. 4F are each a diagram explaining a mechanism to detect a print defect;

FIG. 6 is a diagram showing an example of a lower limit value table according to a first embodiment;

FIG. 13 is a diagram showing an example of a lower limit value table according to a second embodiment;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

Figure 1:
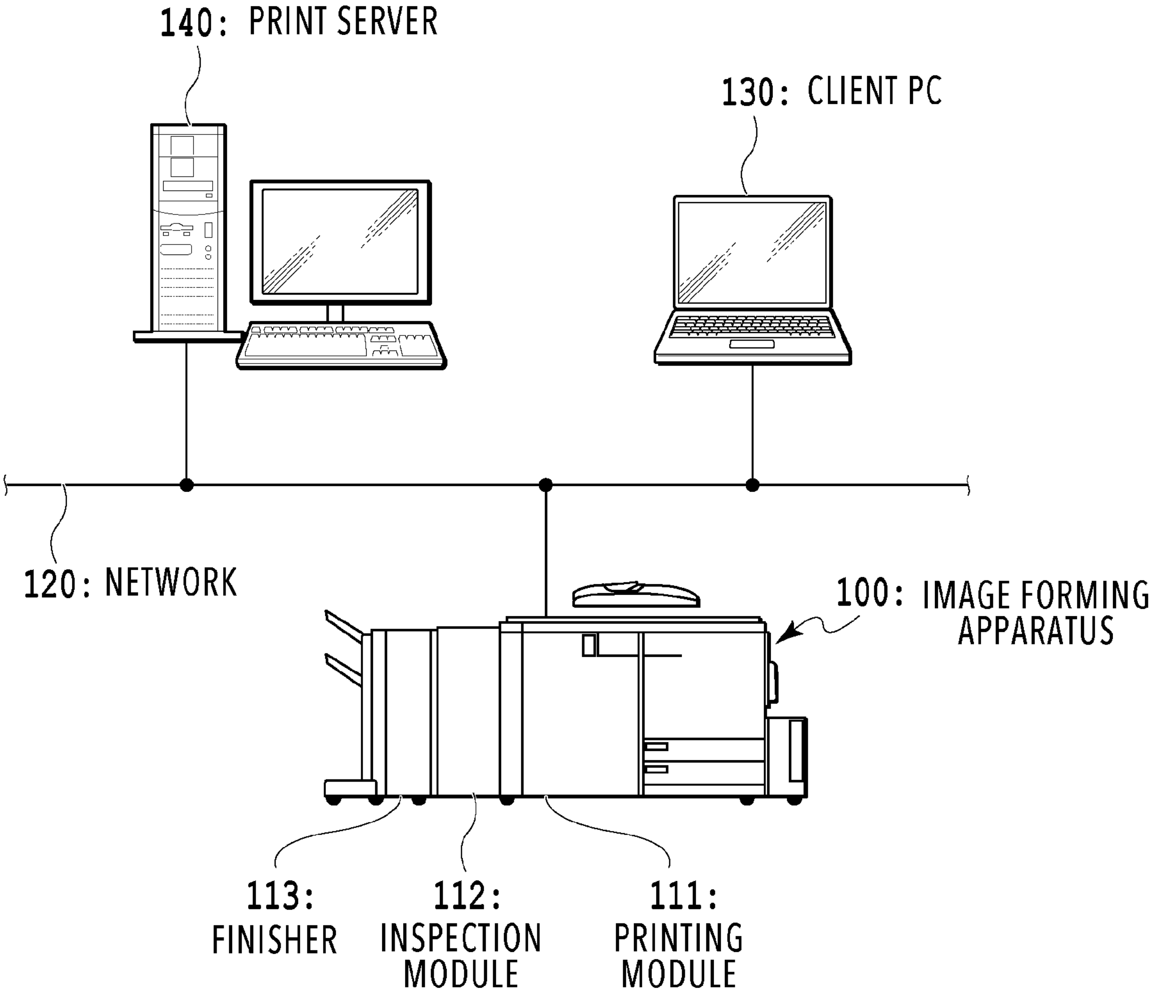
FIG. 1 is a diagram showing an example of a configuration of a printing system.

FIG. 1 is a diagram showing an example of the configuration of a printing system according to the present embodiment. In the printing system, an image forming apparatus 100 having an inspection function is connected to a client PC 130 and a print server 140 via a network 120 so as to be capable of communication. Further, the image forming apparatus 100 comprises a printing module 111, an inspection module 112, and a finisher 113.

The printing module 111 is a module that performs print processing based on print data that is sent from the client PC 130 or the print server 140. The printing module 111 also functions as a main module that comprehensively controls the entire image forming apparatus 100.

The inspection module 112 is a module that inspects whether or not there is a defect in a printed material output from the printing module 111. Here, the defect means what reduces the quality of a printed material that occurs in print processing, for example, such as a stain that occurs by a color material sticking to an unintended place and color omission that occurs by a sufficient amount of color material not sticking to an intended place.

The finisher 113 is a module that performs post-processing (binding and the like) for the printed material having been inspected by the inspection module 112 as needed and discharges the printed material to a discharge destination in accordance with the inspection results.

The printing module 111, the inspection module 112, and the finisher 113 are connected to one another via a communication cable and it is possible for the image forming apparatus 100 to perform printing, inspection, post-processing, and sheet discharge in an integrated manner. The printing module 111, the inspection module 112, and the finisher 113 configuring the image forming apparatus 100 may be devices independent of one another.

<Internal Configuration of Printing Module>

Figure 2:
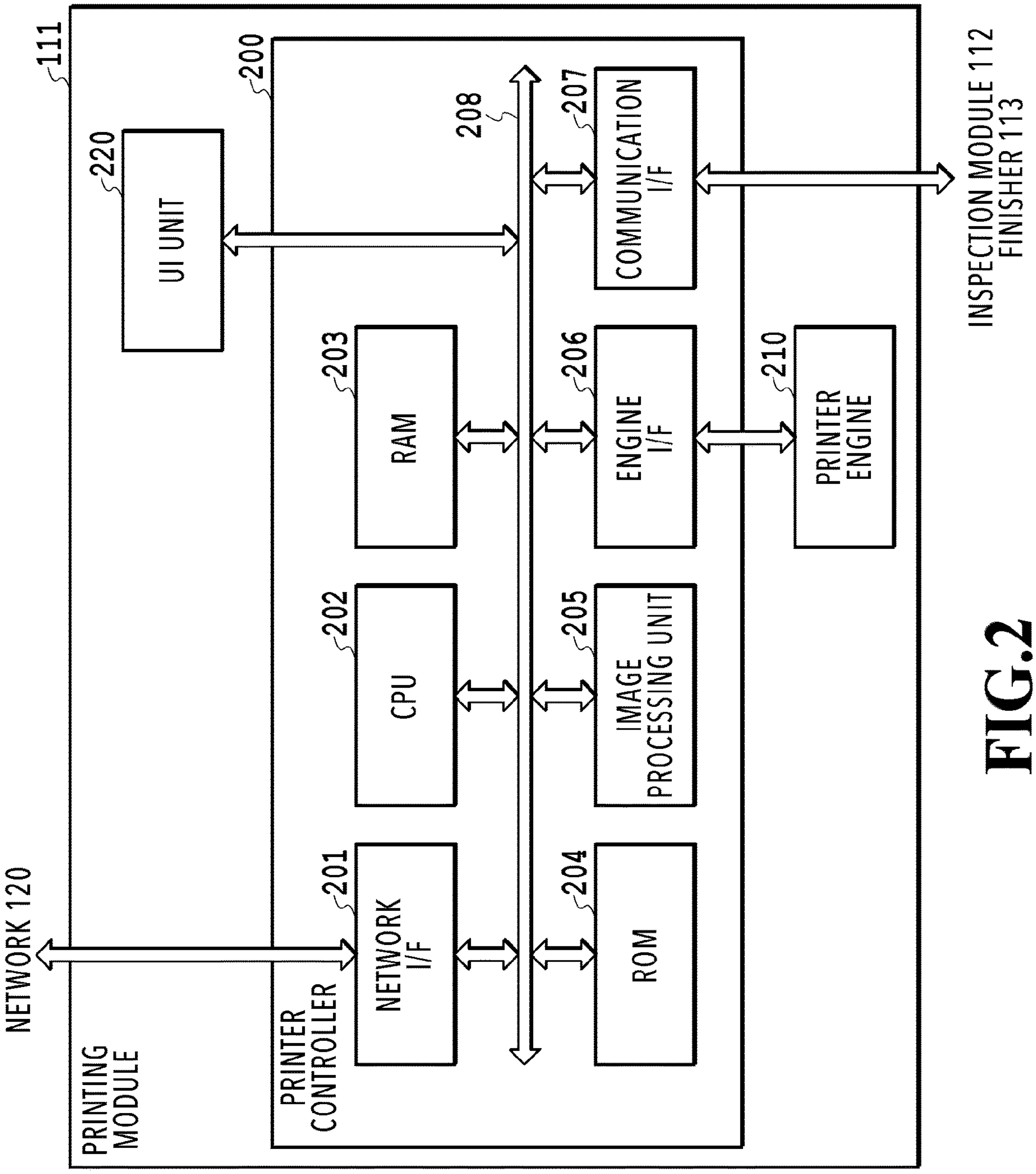
FIG. 2 is an internal configuration diagram of a printing module 111.

FIG. 2 is a diagram showing the internal configuration of the printing module 111. The printing module 111 has a printer controller 200, a printer engine 210, and a UI unit 220. The printer controller 200 is a controller that controls the entire printing module 111. The printer engine 210 is a printer engine that forms an image on a sheet by a predetermined printing method, such as the electrophotographic method and the ink jet method. The UI unit 220 is an interface for a user to set a printing condition and so on and includes a touch panel display and the like.

First, the printer controller 200 is explained. The printer controller 200 has a network I/F 201, a CPU 202, a RAM 203, a ROM 204, an image processing unit 205, an engine I/F 206, a communication I/F 207, and a system bus 208.

The network I/F 201 is an interface for performing transmission and reception of data with the client PC 130 and the print server 140 via the network 120. The CPU 202 is a central processing unit configured to perform control of the entire printing module 111. The RAM 203 is a volatile memory that is used as a work area at the time of the CPU 202 performing various instructions and the ROM is a nonvolatile memory that stores programs executed by the CPU 202 at the time of activation and data of various setting values and the like. The image processing unit 205 generates print data that the printer engine 210 can process by performing predetermined image processing for printing-target image data received from the network 120. The engine I/F 206 is an interface for delivering the print data generated by the image processing unit 205 to the printer engine 210. The communication I/F 207 is an interface for communicating with the inspection module 112 and the finisher 113. The system bus 208 is an internal bus that connects components with one another described above within the printing module 111.

In a case where a user prints a document and the like created by a document application and the like, the user converts the image data of the document and the like into the format of PDL data and transmits it to the image forming apparatus 100 by using the client PC 130 and the print server 140. The image forming apparatus 100 having received the PDL data stores it in the RAM 203. Further, information on printing conditions, such as the sheet type and the sheet size, designated by a user via the UI unit 220 is also stored in the RAM 203. Then, the CPU 202 gives printing instructions to the printer engine 210 based on the printing conditions stored in the RAM 203. For example, in a case where coated paper is set as the sheet type in the printing condition, the CPU 202 instructs the printer engine 210 to feed a sheet from the sheet cassette (not shown schematically) storing the coated paper. The image processing unit 205 obtains the PDL data stored in the RAM 203, performs predetermined image processing, and converts it into print data. The image processing here includes rasterizing processing to generate multivalued bitmap data by analyzing PDL, screen processing to convert multivalued bitmap data into binary bitmap data, and the like. The binary bitmap data obtained by the image processing is transmitted to the printer engine 210 via the engine I/F 206. Then, the printer engine 210 forms an image on a sheet using color materials based on the binary bitmap data provided from the printer controller 200.

As above, by the various kinds of processing from the reception of PDL data until printing of a sheet being controlled by the CPU 202, a full-color image is formed on a designated sheet and the printed material thus obtained is output to the inspection module 112

<Internal Configuration of Inspection Module 112>

Figure 3:
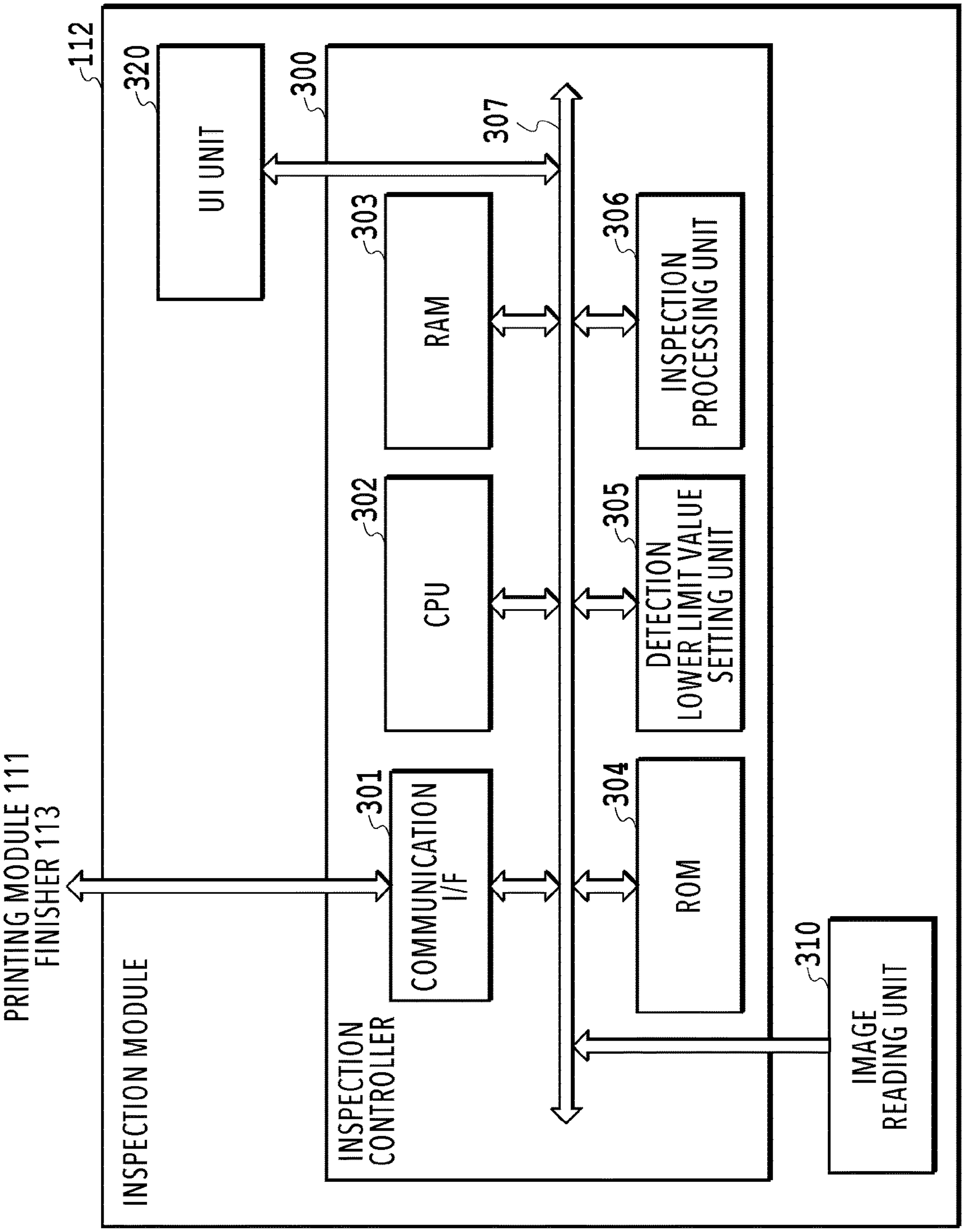
FIG. 3 is an internal configuration diagram of an inspection module 112.

FIG. 3 is a diagram showing the internal configuration of the inspection module 112. The inspection module 112 has an inspection controller 300, an image reading unit 310, and a UI unit 320. The inspection controller 300 is a controller that controls the entire inspection module 112. The image reading unit 310 performs image capturing or the like with a camera, not shown schematically, for a printed sheet that is output from the printing module 111 and obtains an inspection-target image (in the following, called "inspection image"). The UI unit 320 is an interface for a user to set an inspection condition and so on, and includes a touch panel display and the like. Here, the inspection condition includes what kind of detect is inspected (inspection item), how small defect is inspected (inspection level), and the like at the time of inspecting a printed material. As the inspection item, there is a circular defect (in the following, described as "spot"), a linear defect (in the following, described as "streak") or the like. As the inspection level, it is made possible to set stepwise by providing a plurality of level values, for example, such as 1 to 5. In the present embodiment, the level value and the inspection contents are associated with each other so that the smaller the level value, the lower the density and the smaller the size, a defect with which can be detected. Further, it may also be possible to enable setting of an arbitrary inspection level to each inspection item, for example, such as setting of the inspection level 5 to "spot" and setting of the inspection level 4 to "streak".

The inspection controller 300 has a communication I/F 301, a CPU 302, a RAM 303, a ROM 304, a detection lower limit value setting unit 305, an inspection processing unit 306, and a system bus 307. The communication I/F 301 is an interface for performing data communication with the printing module 111 and the finisher 113. The CPU 302 is a central processing unit configured to perform control of the entire inspection module 112. The RAM 303 is a volatile memory that is used as a work area at the time of the CPU 302 performing various instructions and the ROM 304 is a nonvolatile memory that stores programs executed by the CPU 202 at the time of activation and data of various setting values and the like. The detection lower limit value setting unit 305 performs setting processing to calculate and store the lower limit value of the threshold value used for defect detection (in the following, called "detection lower limit value) for each inspection item under the control of the CPU 302. The inspection processing unit 306 inspects whether or not there is a defect in the printed material sent from the printing module 111 in accordance with the inspection conditions under the control of the CPU 302. Details of the detection lower limit value setting unit 305 and the inspection processing unit 306 will be described later. The system bus 307 is an internal bus that connects the components with one another described above within the inspection module 112.

The UI unit 320 is an interface for a user to set an inspection condition, check inspection results and so on, and includes a touch panel display and the like.

<Outline of Inspection>

Following the above, an outline of inspection (inspection processing) of a printer material performed by the inspection module 112 is explained. In the inspection processing, first, as preparation processing, a threshold value (detection threshold value) for defect detection for each inspection item is determined based on three pieces of information: sheet type, inspection condition, and detection lower limit value. In the present embodiment, as the detection threshold value, a contrast threshold value and a size threshold value are determined. It is necessary to register in advance the detection lower limit value.

After completion of the preparation processing, an inspection-target printed material that is conveyed from the printing module 111 is read by the image reading unit 310 and an inspection image is obtained. The obtained inspection image is stored in the RAM 303.

Then, an image indicting the difference (in the following, "difference image") between the correct image stored in advance and the inspection image obtained by reading the printed material is generated. Here, it is assumed that in the correct image and the inspection image, each pixel has 8-bit (0 to 255) RGB values. The difference image is an image obtained by finding the difference value between corresponding pixels for each of the RGB channels and putting the difference values together into one channel by calculating the average value thereof and so on. The difference image is only required to be an image capable of evaluating a difference portion between the correct image and the inspection image and for example, it may also be possible to convert RGB values into L*a*b* values and generate an image representing a difference in the L* value (lightness) between both images as a difference image. Further, in a case where the correct image has, for example, CMYK values, it is sufficient to perform processing after converting the CMYK values into RGB values by color conversion and the like using a 3D-LUT. Like the detection lower limit value, it is necessary to register in advance the correct image.

Next, each pixel value of the generated difference image is compared with the detection threshold value for each inspection item determined in the preparation processing and the presence/absence of a print defect is inspected. The inspection results are stored in the RAM 303 and the presence/absence of occurrence of a print defect and the kind of print defect that has occurred are displayed on the UI unit 320. Due to this, a user recognizes the inspection results.

Further, the inspection module 112 notifies, in a case where a predetermined number of printed materials with a print defect has occurred successively, the printing module 111 of this fact. Upon receipt of the notification, the printing module 111 stops the printing operation. Further, the inspection module 112 notifies the printing module 111 of the inspection results at any time and under the control via the printing module 111, discharges the printed material for which the inspection by the finisher 113 is completed to a predetermined discharge destination.

<Mechanism of Defect Detection>

Next, a mechanism to detect a print defect from a difference image by using a detection threshold value is explained by using FIG. 4A to FIG. 4F.

FIG. 4A is a schematic diagram showing a part (area of 5×5 pixels) of a difference image obtained by comparing the correct image and the inspection image and each numerical value in FIG. 4A indicates the pixel value. Then, FIG. 4B to FIG. 4F each indicate results of applying a contrast threshold value and a size threshold value as detection threshold values to the difference image in FIG. 4A. Here, the contrast is a signal difference between corresponding pixels in the correct image and the inspection image and the size indicates the number of pixels.

FIG. 4B shows results of performing threshold value processing for each pixel of the difference image in FIG. 4A by setting the contrast threshold value to "30" and the size threshold value to "5". In FIG. 4B, the gray pixel indicates a pixel having a pixel value larger than or equal to the contrast threshold value and the number of gray pixels is "13". In this case, the number of pixels in the gray pixel group is larger than the size threshold value, and therefore, the gray pixel group is detected as a print defect.

FIG. 4C shows results of performing threshold value processing for each pixel of the difference image in FIG. 4A by setting the contrast threshold value to "60" and the size threshold value to "5". In this case there is no pixel whose pixel value is larger than or equal to the contrast threshold value within the difference image, and therefore, no print defect is detected.

FIG. 4D shows results of performing threshold value processing for each pixel of the difference image in FIG. 4A by setting the contrast threshold value to "45" and the size threshold value to "10". In FIG. 4D, the number of pixels in the gray pixel group having a pixel value larger than or equal to the contrast threshold value is "5". In this case, the number of pixels in the gray pixel group is smaller than the size threshold value, and therefore, the gray pixel group is not detected as a print defect.

FIG. 4E shows results of performing threshold value processing for each pixel of the difference image in FIG. 4A by setting the contrast threshold value to "45" and the size threshold value to "3". In FIG. 4E also, the number of pixels in the gray pixel group having a pixel value larger than or equal to the contrast threshold value is "5". In this case, the number of pixels in the gray pixel group is larger than the size threshold value, and therefore, the gray pixel group is detected as a print defect.

FIG. 4F shows results of performing threshold value processing for each pixel of the difference image in FIG. 4A by setting the contrast threshold value to "15" and the size threshold value to "5". In FIG. 4F, all the pixels in the area of 5×5 pixels have a pixel value larger than or equal to the contrast threshold value. In this case, the number of pixels in the gray pixel group is larger than the size threshold value, and therefore, the entire area of 5×5 pixels shown in FIG. 4F is detected as a print defect.

As above, by the threshold value processing using the detection threshold value, a print defect is detected from the difference image. As described above, it is seen that in a case where the contrast threshold value and the size threshold value as the detection threshold values change, the print detect that is detected also changes. In the present embodiment, it is made possible to set detection threshold values in accordance with any inspection level by taking a combination of the relatively largest contrast value and size value as the detection threshold values in accordance with the inspection level "1" and taking the relatively smallest contrast value and size value as the detection threshold values in accordance with the inspection level "5".

<Setting of Detection Lower Limit Value>

Following the above, the lower limit value of the detection threshold value (detection lower limit value), which needs to be registered before the start of inspection, is explained. As described previously, the detection lower limit value is used to prevent an impurity included in a sheet from being erroneously detected as a print defect. Then, impurities included in a sheet are different depending on the material of the sheet and the manufacturing process of the sheet. For example, the coated paper is manufactured by using chemical substances not including crushed wood pulp as a material and the included impurity is small and the number of included impurities is small compared to those of plain paper. Further, different from the plain paper, the surface of the coated paper is coated with paint. As described above, there are various differences between sheets depending on their types, and therefore, it is necessary to find a detection lower limit value suitable to the sheet type. In the present embodiment, the contrast value and the size value corresponding to the impurity included in the target sheet are found and set as the detection lower limit values in association with the sheet type. In the following, detailed explanation is given.

Figures 5A, 5B, 5C, 5D:
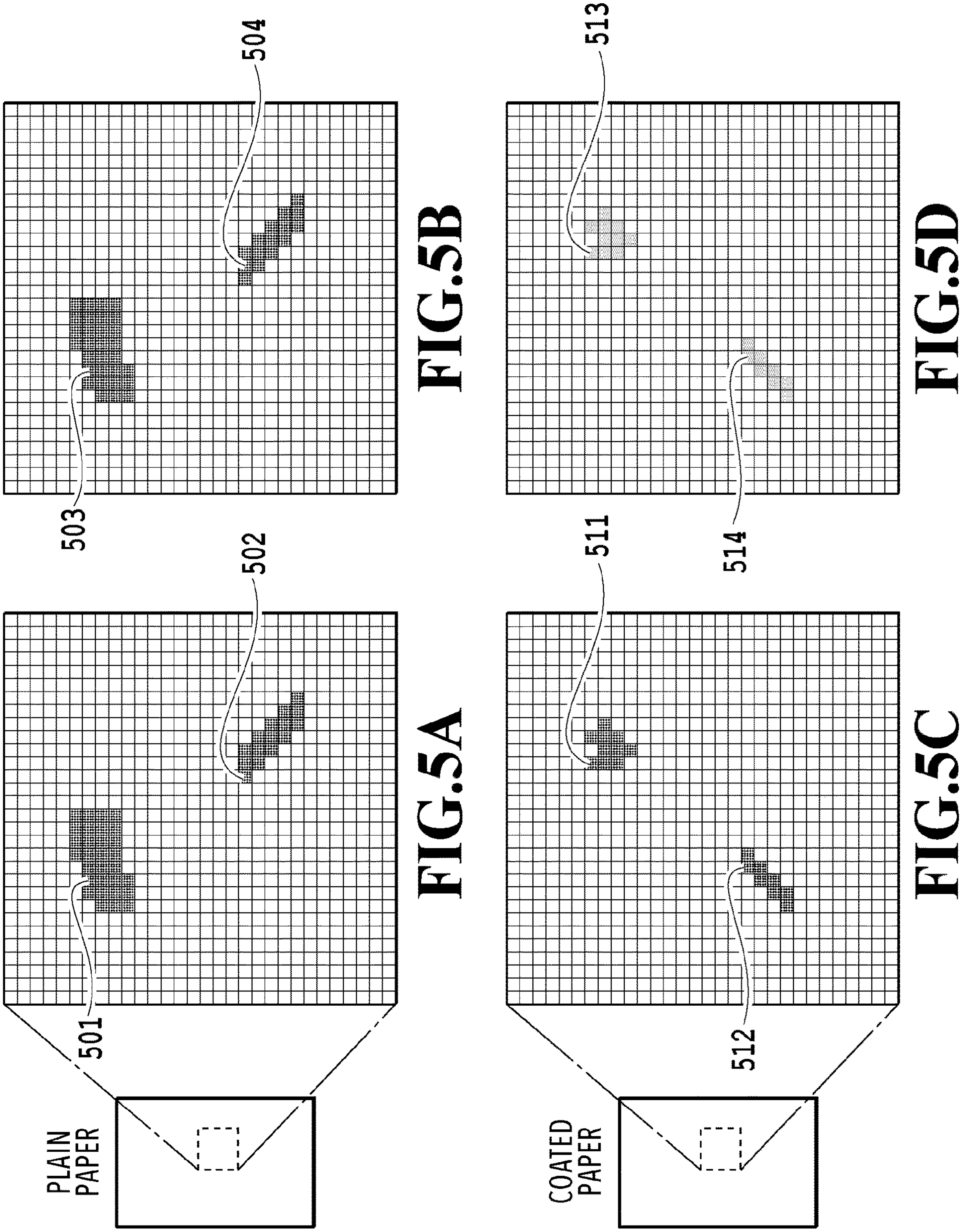
FIG. 5A to FIG. 5D are each a diagram explaining that impurities included in a sheet are different for each sheet type.

FIG. 5A is a schematic diagram in which a part of an image obtained by reading blank plain paper on which nothing is printed with the image reading unit 310 is enlarged and FIG. 5B shows results of subtracting the value of paper white from the image in FIG. 5A. Further, FIG. 5C is a schematic diagram in which a part of an image obtained by reading blank coated paper on which nothing is printed with the image reading unit 310 is enlarged and FIG. 5D shows results of subtracting the value of paper white from the image in FIG. 5C. Here, the "value of paper white" means the pixel value in a read image of a sheet in the state where no impurity is included. In a case of the plain paper, the appearance of pixel groups 501 and 502 indicating impurities in FIG. 5A and that of pixel groups 503 and 504 indicating impurities in FIG. 5B are almost the same. This represents that in a case of the plain paper, there is almost no change by the subtraction of the value of paper white. On the other hand, in a case of the coated paper, compared to pixel groups 511 and 512 indicating impurities in FIG. 5C, the density of pixel groups 513 and 514 indicating impurities in FIG. 5D is low. This represents that in a case of the coated paper, a change in a case where the value of paper white is subtracted is large. Then, from a comparison between FIG. 5B and FIG. 5D, it is seen that the contrast corresponding to the impurities is lower and the size of the impurities is smaller in the coated paper than those in the plain paper.

In the case of the above-described example, the contrast threshold value and the size threshold value need to be larger than the contrast value and the size value of the pixel groups 503 and 504 in the case of the plain paper and the contrast threshold value and the size threshold value need to be larger than the contrast value and the size value of the pixel groups 513 and 514 in the case of the coated paper, The reason is that in a case where the contrast threshold value and the size threshold value in accordance with the inspection level that is set by a user are less than or equal to the contrast value and the maximum size representing impurities in each sheet, even though there is no print defect, the impurity included in the sheet is detected as a print defect. As described above, the contrast value and the maximum size of the impurity included in the sheet are the lower limit values (detection lower limit values) of the detection threshold values that do not cause erroneous detection. Of course the numerical value (number of pixels) representing the maximum size changes accordingly in a case where the reading resolution changes. For example, in a case where the number of pixels representing the maximum size at the reading resolution of 300 dpi is "10", the number of pixels representing the maximum size in a case where the reading resolution is changed to 600 dpi is "20", which is double "10".

FIG. 6 shows an example of a table storing the detection lower limit values found for each sheet type and each kind of shape of the impurity (in the following, called "lower limit value table"). Information on the detection lower limit value is stored, for example, in the RAM 303 before the start of inspection in the table format as shown in FIG. 6. In the lower limit value table in FIG. 6, for a point-like impurity included in the plain paper (impurity having a possibility of being erroneously detected as "spot"), in a case where the contrast threshold value is "25", the maximum size is "15" and in a case where the contrast threshold value is "26", the maximum size is "10". This indicates that values larger than the values shown in the lower limit value table in FIG. 6 should be set as detection threshold values because in a case of a printed material using the plain paper, on a condition that the detection threshold values are smaller than those values in the lower limit value table, impurities included in the plain paper is detected as a print defect. Further, from the lower limit value table in FIG. 6, it is seen that the maximum size of the impurity in the case of the coated paper is relatively smaller than that in the case of the plain paper. This means that in a case where a pixel group whose contrast value is larger than or equal to a certain contrast value is extracted, the maximum size for determining whether the pixel group is an impurity is smaller in the coated paper than in the plain paper. The lower limit value table in FIG. 6 is an example and the sheet type and the kind of shape of the impurity are not limited to those shown in the lower limit value table. Further, it may also be possible to store information on the lower limit value in a format other than the table format.

Figure 7A:
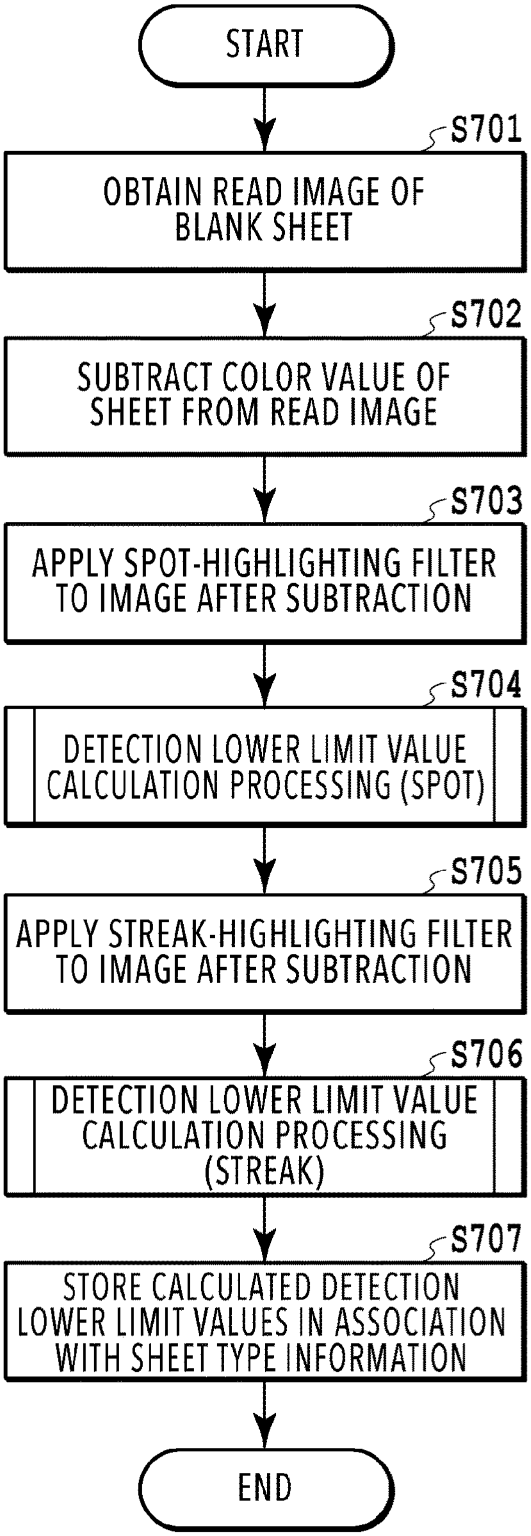
FIG. 7A is a flowchart showing a flow of processing to register a detection lower limit value and FIG. 7B is a flowchart showing details of detection lower limit value calculation processing.

FIG. 7A is a flowchart showing a flow of processing to calculate and store the above-described detection lower limit value for each sheet type, which is performed by the detection lower limit value setting unit 305 of the inspection controller 300. The series of processing shown in the flowchart in FIG. 7A is implemented by the CPU 302 executing a predetermined program. Further, it is assumed that a user completes the setting of information specifying the sheet type of the processing-target sheet by the procedure as shown below prior to the processing. First, the user sets a sheet of predetermined sheet type in a sheet feed cassette (not shown schematically) within the printing module 111. Then, the user inputs the information specifying the sheet type of the set sheet (in the following, called "sheet type information") and gives instructions to feed the set sheet via the UI unit 220 of the printing module 111. The printing module 111 having received the sheet feed instructions starts sheet feed from the sheet feed cassette designated by the user and at the same time, transmits the sheet type information on the sheet relating to sheet feed to the inspection module 112 via the communication I/F unit 207. The transmitted sheet type information is stored in the RAM 303 within the inspection controller 300. In the following explanation, symbol "S" means a step.

At S701, the blank sheet that is conveyed from the printing module 111 is read by the image reading unit 310. The data of the obtained read image is stored in the RAM 303 in association with the sheet type information stored in the RAM 303.

At next S702, processing to subtract the color value representing the base color of the sheet from the read image of the blank sheet obtained at S701 is performed. Here, it is possible to obtain the color value representing the base color by calculating the average value of pixel values in a range in which it is possible to ignore the pixel value corresponding to the impurity included in the sheet in the read image of the blank sheet, for example, in a range of all the pixels constituting the read image. This is because the impurity included in the sheet is so minute that it is difficult for the human eyes to find it, and therefore, in a case where the average value of the pixel values is calculated for the entire sheet, it is possible to ignore the influence of the impurity. In the case of the present embodiment, the calculation of the color value representing the base color and the subtraction processing that follows are performed after converting the three channels of RGB into one channel. In a case where white is taken to be "255" and black to be "0" with 8-bit precision, a value, such as "237", for the plain paper, or a value, such as "230", for the coated paper, is calculated as the color value representing the base color (paper white). Then, the color value representing the base color of the sheet such as this is subtracted form the pixel value of the read image of the blank sheet similarly converted into one channel. In the read image of the blank sheet converted into one channel, the pixel value of the portion in which there is no impurity is substantially the same as the color value representing the base color and the pixel value of the portion in which there is an impurity is the color value, such as "180 to "230", representing gray. Consequently, the pixel value after the color value representing the ground color is subtracted is a value close to "0" for the portion in which there is no impurity and a negative value, such as "−10 to −50", for the portion in which there is an impurity. In the present embodiment, the absolute value of the negative value after the subtraction is taken as the pixel value after the color value representing the ground color is subtracted.

At next S703, for the image after the color value representing the base color of the sheet is subtracted from each pixel value, processing to apply a filter for highlighting the spot is performed. The filter in this case is a filter having the effect to extend the range of the pixel group corresponding to the point-like impurity in the image and by this, an image in which the portion corresponding to the point-like impurity is highlighted (in the following, called "spot-highlighted image") is obtained. The reason the filter processing to highlight the spot is performed at this step for the image obtained at S702 is that threshold value processing using the detection threshold values is performed for the inspection image after the filer to highlight the spot is applied in the inspection stage (inspection processing) of a print defect, to be described later.

Figure 7B:
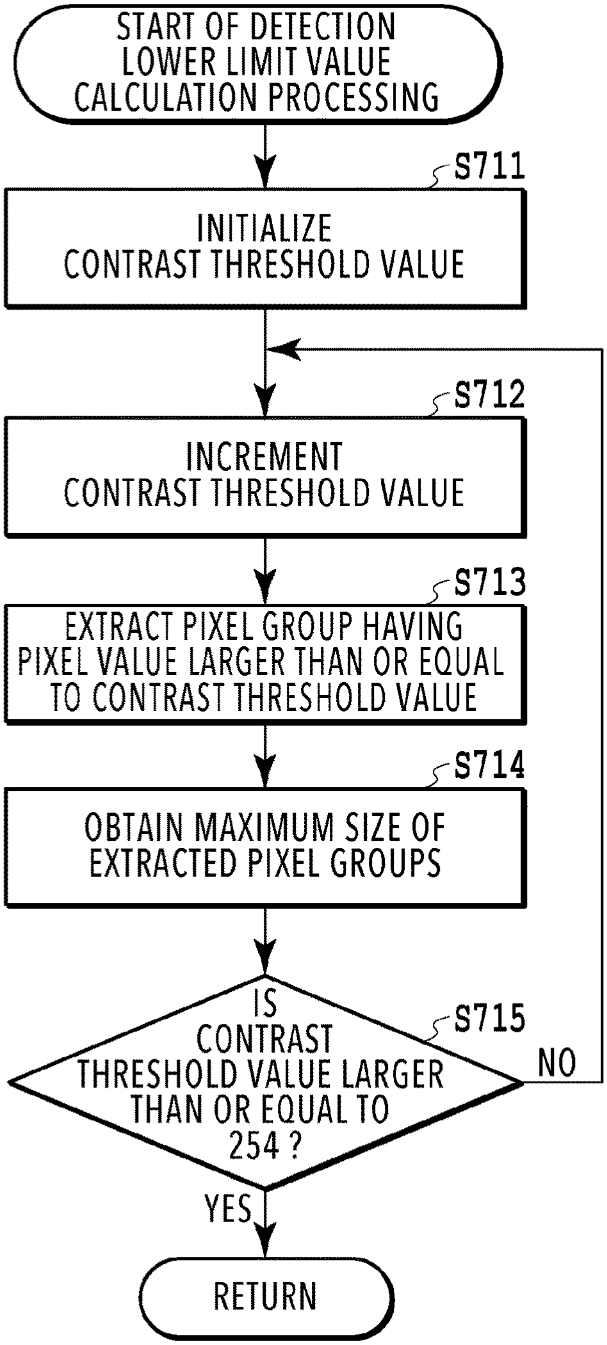

At next S704, based on the spot-highlighted image obtained at S703, the detection lower limit values for distinguishing between the "spot" as a print defect and the impurity included in the sheet are calculated. Here, with reference to another flowchart shown in FIG. 7B, the detection lower limit value calculation processing is explained in detail.

<<Detection Lower Limit Value Calculation Processing>>

First, at S711, the contrast threshold value is initialized. This contrast threshold value corresponds to the value that is input in the item "Contrast" in the lower limit value table in FIG. 6 described previously and in order to perform each subsequent piece of processing in order from the smallest value, "0" is set as the initial value here. At S712 that follows, the contrast threshold value is incremented (+1). Then, at next S713 and S714, the maximum size of the impurity corresponding to the contrast threshold value after being incremented at S712 (contrast threshold value of interest) is calculated. Then, the calculated maximum size is the size threshold value associated with the contrast threshold value of interest.

Figure 8C:
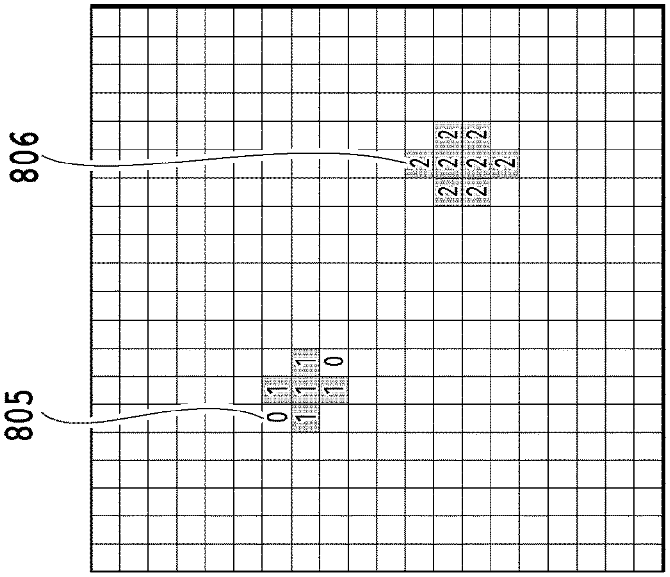
FIG. 8A to FIG. 8C are each a diagram explaining the way a pixel having a contrast value larger than or equal to a contrast threshold value from a defect-highlighted image.
Figure 8B:
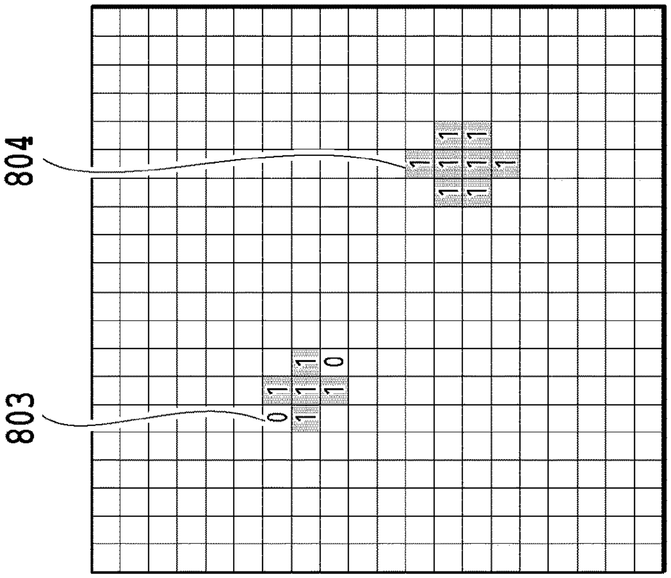
Figure 8A:
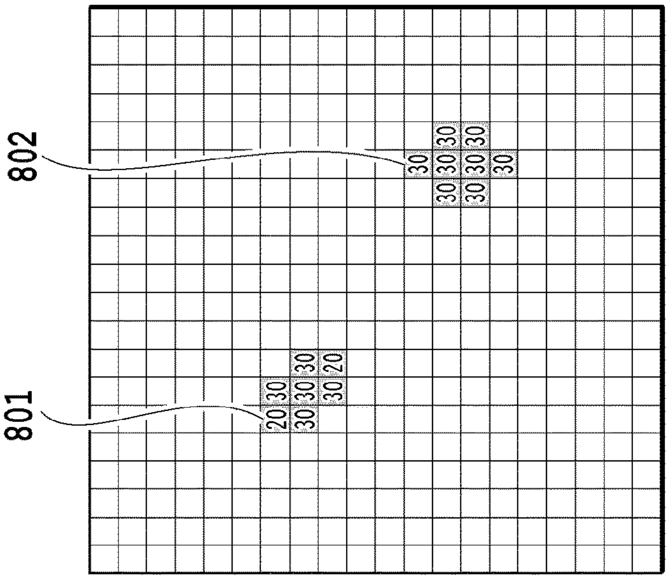

First, at S713, from the spot-highlighted image obtained at S703, an image group having a contrast value larger than or equal to the contrast threshold value of interest is extracted. Here, specific explanation is given by using FIG. 8A to FIG. 8C. FIG. 8A is a diagram in which a part of the spot-highlighted image is enlarged and each cell represents a pixel. Then, the numerical value within the gray cell indicates the contrast value of the pixel. Each white cell is the pixel whose contrast value is "0". In FIG. 8A, pixel groups 801 and 802 each indicate a point-like impurity included in the sheet. FIG. 8B shows results of performing binarization by attaching "1" to the pixel having a contrast value larger than or equal to the contrast threshold value and "0" to the pixel having a contrast value less than the contrast threshold value in a case where the contrast threshold value of interest is "25". In the binary image shown in FIG. 8B, a pixel group 803 is a pixel group in which to the two pixels having the contrast value "20" in the pixel group 801, "0" is attached and to the five pixels having the contrast value "30", "1" is attached. Further, a pixel group 804 is a pixel group in which to all the eight pixels having the contrast value "30", which constitute the pixel group 802, "1" is attached. The results of performing labeling for each pixel group within the binary image such as this are shown in FIG. 8C. Here, labeling is processing to attach the same label (in the present embodiment, common number) to the pixels having the value "1" and adjacent to each other in the binary image. For example, the pixel group 803 and the pixel group 804 in the binary image in FIG. 8B are not adjacent to each other, and therefore, different label numbers are attached. As a result of that, as shown in FIG. 8C, to each pixel in a pixel group 805 corresponding to the pixel group 803, a label number of "1" is attached and to each pixel in a pixel group 806 corresponding to the pixel group 804, a label number of "2" is attached. As described above, by performing binarization using the contrast threshold value of interest for the spot-highlighted image and performing labeling for each pixel group in the obtained binary image, it is possible to extract a pixel group having a contrast value larger than or equal to the contrast threshold value.

At next S714, by taking each pixel group extracted at S713 as a target, the number of pixels to which the same label number is attached is counted and the pixel group consisting of the largest number of pixels among all the extracted pixel groups is determined. In the example in FIG. 8C described above, the number of pixels to which the label number "1" is attached is "5" and the number of pixels to which the label number 2 is attached is "8". That is, in FIG. 8C, the maximum size of the point-like impurity in a case where the contrast threshold value of interest is "25" is determined to be "8 (pixels)".

At next S715, whether or not the contrast threshold value of interest is larger than or equal to "254" is determined, which is the upper limit value of the contrast value. That the contrast threshold value of interest is larger than or equal to "254" indicates that the maximum size of the point-like impurity is determined for each of the contrast values from "1" to "254". That is, as the detection lower limit value in a case where "Sheet Type" is "Plain paper" and "Kind of Impurity" is "Spot" in the lower limit value table in FIG. 6 described previously, the size threshold value for each of the contrast values "1" to "254" is determined. In a case where the contrast threshold value of interest is larger than or equal to "254", this processing is exited.

The above is the contents of the detection lower limit value calculation processing. After this processing is exited, the processing returns to the flowchart in FIG. 7A and the processing advances to next S705. It may also be possible for a user to designate the range for which the detection lower limit value is calculated by taking into consideration the capacity of the memory for storage and the calculation time. For example, in a case where a user designates the range of the contrast threshold values "16" to "128", in the initialization processing at S711, as the initial value of the contrast threshold value, "16" is set and at S715, whether or not the contrast threshold value is larger than or equal to "128" is determined. Further, it may also be possible to calculate the detection lower limit value by only the contrast threshold value in accordance with each level value of the inspection level. For example, in a case where the contrast threshold value of the level value "1" is "60" and the contrast threshold value of the level value "5" is "25", the detection lower limit value is calculated in the range in which the contrast threshold value is between "25" and "60", and so on.

Explanation is returned to the flowchart in FIG. 7A.

Following S704, at S705, processing to apply a filter for highlighting a streak is performed for the image after the subtraction, which is obtained at S702. The filter in this case is a filter having the effect to extend the range of the pixel group corresponding the linear impurity in the image and due to this, an image in which the pixel group corresponding to the linear impurity is highlighted (in the following, called "streak-highlighted image") is obtained. The reason the filter processing to highlight the streak is performed at this step for the image obtained at S702 is the same as in the case of S703. That is, the reason is that in the detection processing of a print defect, to be described later, the threshold value processing using the detection threshold value is performed for the image to which the filter to highlight the streak has been applied.

At next S706, the detection lower limit value for distinguishing between the "streak" as a print defect and the impurity is calculated based on the streak-highlighted image obtained at S705. The contents of the detection lower limit value calculation processing here are the same as those for "spot" explained at S704 and there is no difference in particular, and therefore, explanation is omitted.

Then, at S707, the detection lower limit value relating to "spot" calculated at S704 and the detection lower limit value relating to "streak" calculated at S706 are stored in the RAM 303 in association with the stored sheet type information.

By the series of processing such as this, the information on the detection lower limit value is set prior to the inspection. In the present embodiment, explanation is given by taking the case as an example where the lower limit value for detecting the two kinds of print defect, "spot" and "streak", is calculated, but the detection lower limit value that is calculated is not limited to those. For example, it may also be possible to calculate detection lover limit values corresponding to three kinds of print defect, such as "spot", "vertical streak", and "horizontal streak". Further, in the present embodiment, the detection lower limit value is calculated after converting three channels of RGB into one channel, but it may also be possible to perform calculation without converting three channels of RGB.

<Registration of Correct Image>

Following the above, registration of a correct image is explained. For the registration of a correct image, a printed material for which it has been checked that there is no defect by a user is used. First, the user visually inspects whether or not there is a defect in the printed material for registration, which is output by the printing module 111, and in a case of determining that there is no problem, the user causes the image reading unit 310 of the inspection module 112 to read the printed material. The inspection module 112 displays the read image obtained by reading the printed material on the UI unit 320. In a case of checking that there is no print defect in the read image displayed on the UI unit 320, the user presses down a registration button, not shown schematically, on the UI unit 320. Upon receipt of the registration instructions of the user, the inspection module 112 stores the read image in the RAM 303 as the correct image used for inspection processing. By this work, the correct image that is used as the reference for inspection is registered.

The above is the general flow at the time of registering a correct image. It may also be possible to register print data (bitmap data) generated from PDL data by the image processing unit 205 as a correct image in place of reading a printed material.

<Inspection Processing>

Following the above, the inspection processing according to the present embodiment is explained, which uses the detection lower limit value and the correct image, both registered in advance by the processing as described previously.

<<Setting of Inspection Condition>>

Figures 9A, 9B:
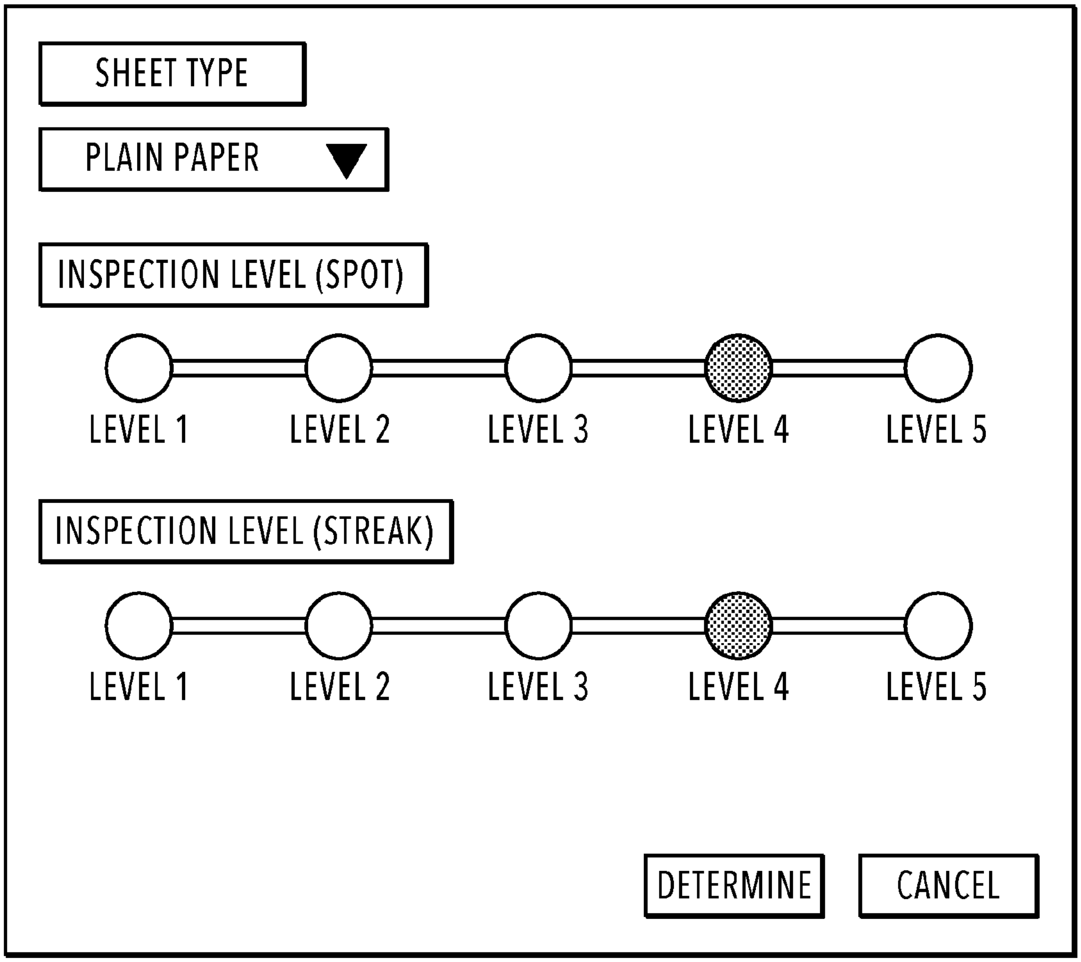
FIG. 9A is a diagram showing an example of a UI screen for setting an inspection condition and FIG. 9B is a diagram showing an example of a table that puts together a detection threshold value for each inspection item.

First, the setting of inspection conditions for settling the contents of the inspection processing is explained. FIG. 9A shows an example of a UI screen for setting inspection conditions, which is displayed on the UI unit 320. On the UI screen in FIG. 9A, selection of sheet type is performed by a pulldown method and selection of inspection level of each of the inspection items "spot" and "streak" is performed by a radio button method. Here, the state is such that "Plain paper" is selected for the sheet type and "level 4" is selected for the inspection level of both "spot" and "streak". FIG. 9B is an example of a table that puts together the detection threshold values (contrast threshold value and size threshold value) for each inspection item in accordance with each inspection level. In the example of the table (in the following, called "threshold value table") shown in FIG. 9B, the detection threshold values are such that it is possible to detect a print defect whose density is lower and whose size is smaller at a higher inspection level. The association between the inspection level and the detection threshold value is arbitrary. For example, the association may be one in which as the inspection level becomes higher, the contrast value remains the same and only the size value becomes smaller. Further, it may also be possible to display the threshold value table shown in FIG. 9B on the UI unit 320 on a sub screen or the like so that it is possible for a user to refer to the table at the time of selecting an inspection level.

In a case where a user presses down a "Determine" button after selecting the sheet type and the inspection level, the sheet type and the inspection conditions are set (stored in the RAM 303) based on the contents of the selection at that point in time. Then, in a case where an inspection start button, not shown schematically, which is displayed on the UI unit 320 is pressed down by a user after the completion of the setting of the inspection conditions, the inspection of a printed material that is output from the printing module 111 is started.

<<Flow of Inspection Processing>>

Figure 10:
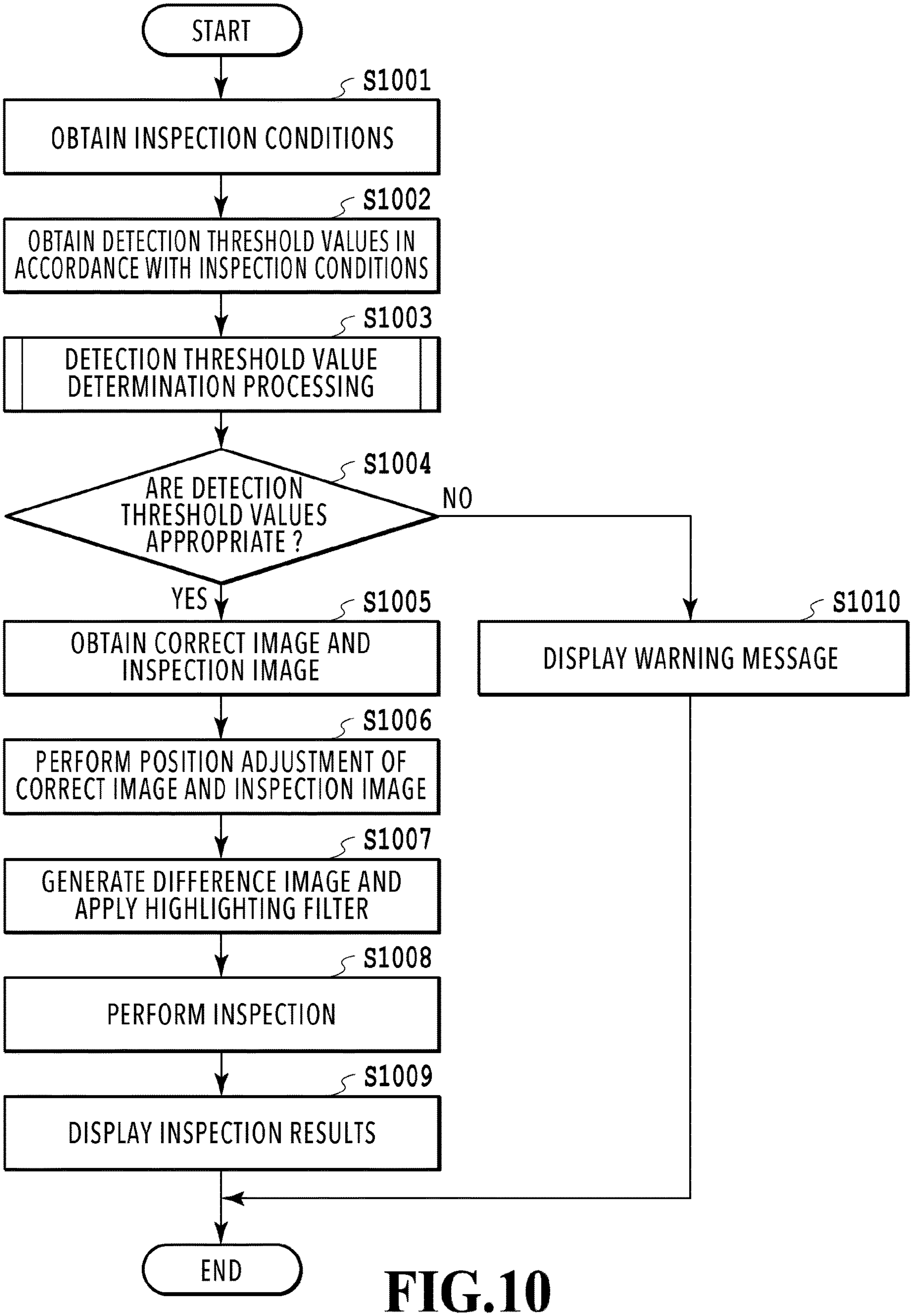
FIG. 10 is a flowchart showing a flow of inspection processing according to the first embodiment.

Following the above, the flow of the inspection of a printed material performed by the inspection processing unit 306 is explained with reference to the flowchart in FIG. 10. The series of processing shown in the flowchart in FIG. 10 is implemented by the CPU 302 executing a predetermined program. In the following explanation, symbol "S" means a step.

At S1001, the setting information on the inspection conditions is obtained. In the setting information on the inspection conditions, information on the sheet type that is used for printing and information on the inspection level for each inspection item are included. Here, each piece of processing at S1002 and subsequent steps is explained on the assumption that the following two patterns are set as the inspection conditions.

Pattern 1
- sheet type: plain paper
- inspection level (spot): level 4
- inspection level (streak): level 4

Pattern 2
- sheet type: plain paper
- inspection level (spot): level 5
- inspection level (streak): level 4

At next S1002, the detection threshold values in accordance with the inspection level designated in the setting information on the inspection conditions obtained at S1001 are obtained with reference to the threshold value table (FIG. 9B) described previously. The detection threshold values obtained by Pattern 1 and Pattern 2 respectively are as follows.

In a case of Pattern 1
- contrast threshold value: "30" for "spot" and "10" for "streak"
- size threshold value: "15" for "spot" and "20" for "streak"

In a case of Pattern 2
- contrast threshold value: "25" for "spot" and "10" for "streak"
- size threshold value: "10" for "spot" and "20" for "streak"

As described above, at this step, the detection threshold value for each inspection item in accordance with the inspection level is obtained.

Figure 11:
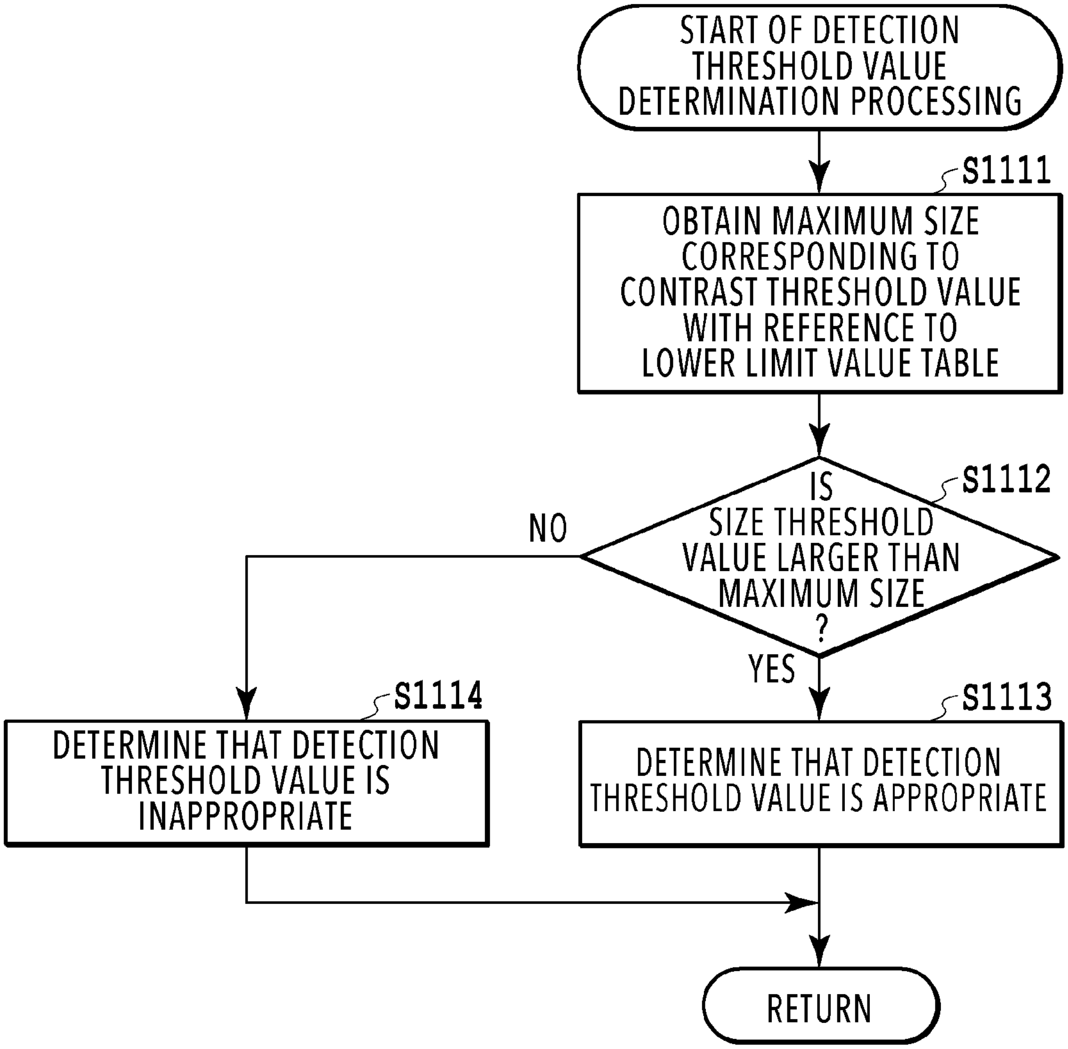
FIG. 11 is a flowchart showing details of detection threshold value determination processing.

Next, at S1003, processing to determine whether the detection threshold values obtained at S1002 are appropriate (whether the detection threshold values are those by which an impurity included in a sheet may be erroneously detected as a print defect) is performed. FIG. 11 is the flowchart showing details of this determination processing. In the following, detailed explanation is given with reference to FIG. 11. This detection threshold value determination processing is performed for each inspection item.

At S1101, for the inspection item of interest, the maximum size of the impurity at the contrast threshold value in accordance with the set inspection level is obtained. Specifically, based on the sheet type obtained at S1001 and the contrast threshold value of the detection threshold values obtained at S1002, with reference to the lower limit value table illustrated in FIG. 6, the maximum size of the impurity for the inspection item of interest is obtained.

The maximum size of the impurity for each inspection item, which is obtained by each of Pattern 1 and Pattern 2, is as follows.

In a case of Pattern 1
- "spot": the maximum size "9" corresponding to the contrast threshold value "30" is obtained
- "streak": the maximum size "18" corresponding to the contrast threshold value "10" is obtained In a case of Pattern 2
- "spot": the maximum size "15" corresponding to the contrast threshold value "25" is obtained
- "streak": the maximum size "18" corresponding to the contrast threshold value "10" is obtained At next S1112, for the inspection item of interest, whether or not the size threshold value in accordance with the set inspection level is larger than the maximum size obtained at S1101 is determined. In a case where the size threshold value is larger than the maximum size, the processing advances to S1113 and in a case where the size threshold value is not larger than the maximum size, the processing advances to S1114. Here, that the size threshold value is larger than the maximum size of the impurity means that in a case where this size threshold value is used, the impurity included in the sheet is not detected as a print defect. The determination results by Pattern 1 and Pattern 2 are as follows, respectively.

In a case of Pattern 1
- "spot": the size threshold value "15" is larger than the detection lower limit value "9", and therefore, appropriate
- "streak": the size threshold value "20" is larger than the detection lower limit value "18", and therefore, appropriate In a case of Pattern 2
- "spot": the size threshold value "10" is smaller than the detection lower limit value "15", and therefore, inappropriate
- "streak": the size threshold value "20" is larger than the detection lower limit value "18", and therefore, appropriate As described above, in a case of Pattern 1, the size threshold values of both "spot" and "streak" are larger than the maximum sizes as the lower limit values, and therefore, the processing advances to S1113. On the other hand, in a case of Pattern 2, for "streak", the size threshold value is larger than the maximum size as the lower limit value, and therefore, the processing advances to S1113 and for "spot", the size threshold value is smaller, and therefore, the processing advances to S1114.

At S1113, it is determined that the detection threshold value in accordance with the set inspection level is the appropriate detection threshold value with which the impurity included in the sheet is not detected erroneously. On the other hand, at S1114, there is a possibility that the impurity included in the sheet is detected erroneously with the detection threshold value in accordance with the set inspection level, and therefore, it is determined that the detection threshold value is not appropriate as the detection threshold value.

The above is the contents of the detection threshold value determination processing. In a case where the detection threshold value determination processing (S1003) is completed for all the inspection items in this manner, the processing returns to the flow in FIG. 10.

At S1004, the step that is performed next is determined in accordance with the results of the determination processing at S1003. In a case where it is determined that all the detection threshold values in accordance with each inspection item, which are obtained at S1002, are appropriate, the processing advances to S1005 and the inspection processing is performed at S1005 to S1009. On the other hand, in a case where it is determined that the detection threshold value of one of the inspection items is inappropriate, the processing advances to S1010 and processing to notify a user of a warning to that effect is performed.

<<Case where Detection Threshold Value is Appropriate>>

First, at S1005, the data of the correct image and the inspection image is obtained. At S1006 that follows, position adjustment of the correct image and the inspection image is performed. For the position adjustment, it may be possible to utilize a publicly known method, such as a method of adjusting the positions of images by performing linear transformation, such as projective transformation, after extracting feature points.

Next, at S1007, first, the difference value is found by comparing the correct image and the inspection image after the position adjustment for each pixel and based on the found difference value for each pixel, the difference image as shown in FIG. 4A described previously is generated. Then, for the generated difference image, filer processing that applies a highlighting filter in accordance with the inspection item is performed.

Following the above, at S1008, for the difference image for which the filter processing has been performed, the inspection based on the detection threshold value in accordance with the inspection item is performed. Then, at S1009, processing to notify the inspection results at S1008 is performed. Specifically, a UI screen including the inspection image and the results of the defect detection processing is displayed on the UI unit 320. On the UI screen in a case where a print detect is detected, the detected defect is highlighted with a dot-line frame, a color frame and the like on the inspection image and further, the kind of detected defect (spot or streak), position information and the like are displayed together. On the other hand, on the UI screen in a case where no print defect is detected, a message, for example, such as "No defect" and "Inspection OK", is displayed along with the inspection image. The method of notifying the inspection results is not limited to those. For example, a notification by a voice may be used and any method may be used as long as it is possible to notify a user of the inspection results in an easy-to-understand manner. The printed material for which the inspection is completed is conveyed to the finisher 113 and output to the discharge destination designated in advance in accordance with the presence/absence of a print defect.

<<Case where Detection Threshold Value is Inappropriate>>

Figure 12A:
FIG. 12A and FIG. 12B are ach a diagram showing an example of a warning screen.
Figure 12B:

At S1010, a warning is displayed. Specifically, a UI screen including a warning message prompting to change the inspection level or the sheet type is displayed on the UI unit 320. FIG. 12A and FIG. 12B are each an example of a UI screen including a warning message. The contents of the warning message in FIG. 12A are that a user is prompted to lower the inspection level or change the sheet type because the detection threshold value in accordance with the inspection level is too small. In a case of Pattern 2 described above, only the detection threshold value for "spot" is determined to be inappropriate and the detection threshold value for "streak" is determined to be appropriate. In the case such as this, for example, as on the UI screen shown in FIG. 12B, it may also be possible to display a warning only for the inspection item determined to be inappropriate. By displaying the warning such as this, it is possible for a user to have a chance to reconsider in advance the inspection level.

The above is the contents of the inspection processing according to the present embodiment. In the flowchart in FIG. 10, after the detection threshold value is determined to be appropriate, the data of the correct image and the inspection image is obtained, but the order of the processing described previously is an example and the order is not limited to this. The timing of performing the detection threshold value determination processing only needs to be before the processing to detect a print defect (S1008).

As described above, according to the present embodiment, the detection lower limit values (the contrast value and the size value indicated by the impurity included in the sheet) for each sheet type are calculated in advance and information thereon is retained. Next, in accordance with the sheet type used for printing, the detection threshold value in accordance with the inspection level that is set by a user and the detection lower limit value are compared and whether or not there is a possibility that the impurity included in the sheet is detected erroneously is determined. Then, in a case where there is a possibility that the impurity included in the sheet is detected erroneously, a warning to that effect is displayed and a user is notified of this. Due to this, it is possible to set an appropriate detection threshold value that reduces the risk that an impurity included in a sheet is detected erroneously.

Second Embodiment

The first embodiment is the aspect in which the contrast value and the size value indicating the impurity included in the sheet are found and registered in advance as the detection lower limit values for each sheet type and whether the detection threshold value in accordance with the inspection level that is set by a user is appropriated is determined based on the detection lower limit value. However, depending on the sheet type, there is a case where the inspection itself is difficult to perform. The reason is that, for example, in a case of colored paper having the ground color other than white, in the difference image between the correct image and the inspection image, the contrast of the pixel corresponding to the defect portion, such as spot and streak, becomes small. That is, in a case of a printed material using colored paper whose color value of the ground color is large, it is difficult even to detect a print defect. Consequently, an aspect is explained as a second embodiment in which in a case where the sheet type that is set by the inspection condition is a sheet type for which it is difficult to perform inspection, a user is warned about that before inspection is started. Explanation of the contents common to those of the first embodiment, such as the system configuration, is omitted or simplified and in the following, different points are explained mainly.

Outline of Second Embodiment

In the present embodiment, first, for each sheet type used for printing, the color value representing the ground color of the sheet is found. Next, based on the found color value of the sheet, whether or not inspection is feasible is determined and the determination results are added and registered to the lower limit value table described previously as inspection feasibility information. Then, prior to execution of the inspection processing, whether the sheet type of the sheet used for printing is a sheet type for which inspection is feasible is determined with reference to the lower limit value table and in a case of the sheet type for which inspection is difficult to perform, a user is warned about that.

<Lower Limit Value Table>

FIG. 13 shows an example of the lower limit value table according to the present embodiment. This lower limit value table is different from the lower limit value table shown in FIG. 6 illustrated in the first embodiment in that an item of "Inspection Feasibility Information" is added. In the lower limit value table shown in FIG. 13. for the plain paper and the coated paper, characters of "Feasible" indicating that it is possible to detect a print defect with no problem is input and for colored paper A, characters of "Infeasible" indicating that detection of a print defect is difficult is input.

<Generation of Inspection Feasibility Information>

Next, a method of obtaining inspection feasibility information by determining whether it is possible to detect a print defect for each sheet type is explained. First, a read image of a determination-target sheet is obtained. Next, from the obtained read image, the color value representing the ground color of the sheet is calculated. In order to calculate the color value of the sheet, it may be possible to find the color value by calculating the average value of, for example, all the pixel values of the read image as at S702 in the flow in FIG. 7. In the following, an example of the color values of the plain paper, the coated paper, and the colored paper A in a case where white is taken to be 255 and black to be 0 with 8-bit precision after the three channels of RGB are converted into one channel is shown.

Plain paper: 237

Coated paper: 230

Colored paper: 70

In the case of the present embodiment, it is meant that the larger the color value of the sheet, the more the contrast value indicating a print defect is maintained at the time of subtracting the color value of the sheet from the difference image between the correct image and the inspection image. That is, the smaller the color value of the sheet, the more difficult the detection of a print defect becomes. Consequently, in a case where the color value of the sheet is smaller than a predetermined value, it is determined that detection is difficult. As the threshold value at this time, it is sufficient to set a value, for example, such as "150", based on a rule of thumb. In a case where "150" is set as the threshold value, as described above, it is determined that inspection is feasible for the plain paper and the coated paper and inspection is difficult for the colored paper A. Then, it is sufficient to add the results of determination of inspection feasibility obtained based on the color value representing the ground color of the sheet in this manner to the lower limit value table as "Inspection Feasibility Information" in association with the sheet type.

By performing each piece of processing as above together with the detection lower limit value calculation processing of the first embodiment (that is, each piece of processing is incorporated in the flowchart in FIG. 7) or separately, the lower limit value table as shown in FIG. 13 is obtained.

<Inspection Processing>

Figure 14:
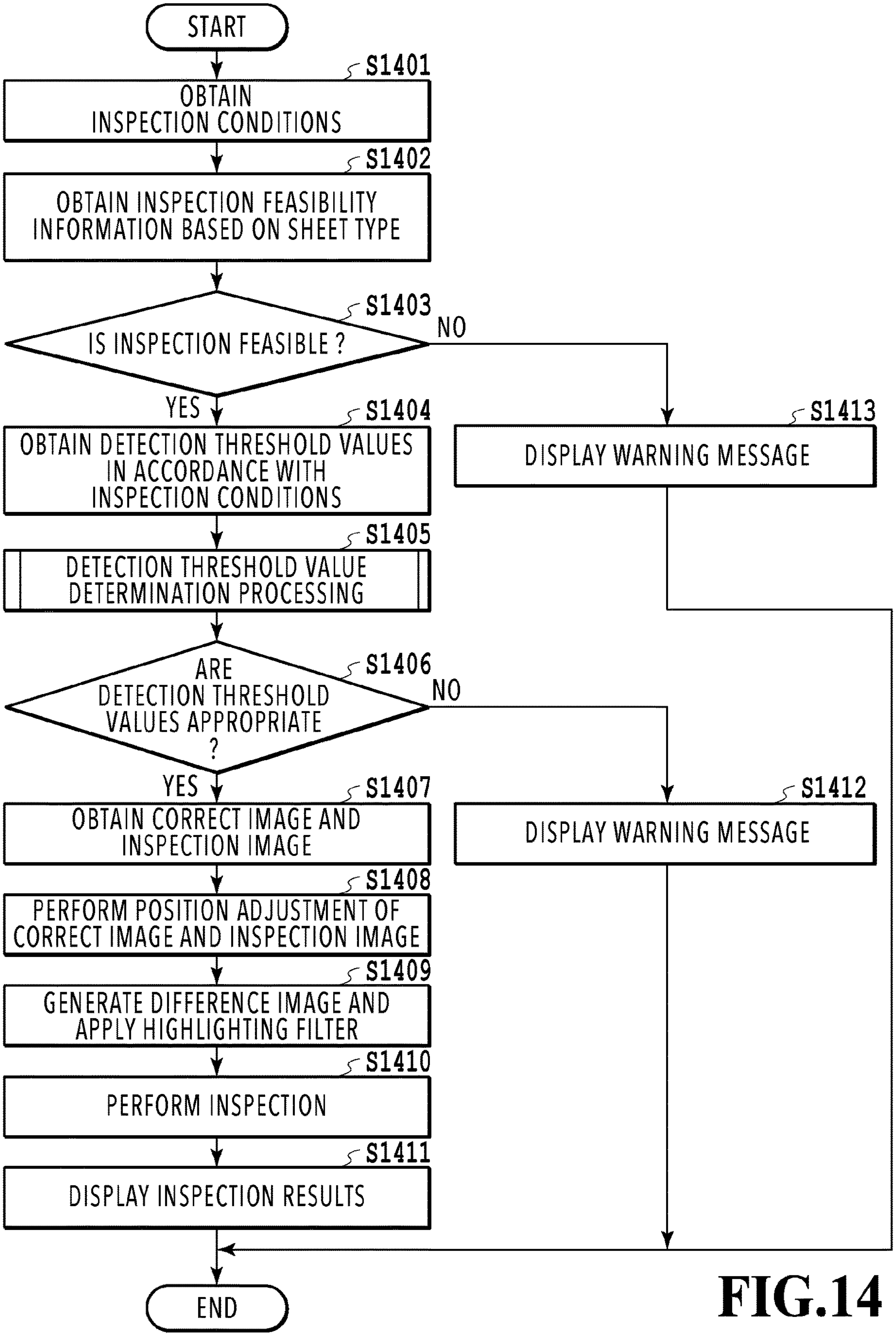
FIG. 14 is a flowchart showing a flow of inspection processing according to the second embodiment.

Following the above, the inspection processing according to the present embodiment is explained with reference to the flowchart in FIG. 14. The series of processing shown in the flowchart in FIG. 14 is implemented by the CPU 302 executing a predetermined program. In the following explanation, symbol "S" means a step.

S1401 is the same as S1001 in the flowchart in FIG. 10 of the first embodiment and the setting information on the inspection conditions is obtained. Here, each piece of processing at S1402 and subsequence steps is explained on the assumption that "Colored paper A" is designated as the sheet type in the setting information on the inspection conditions.

At next S1402, based on the sheet type designated in the setting information on the inspection conditions obtained at S1401, inspection feasibility information is obtained with reference to the lower limit value table (FIG. 13) described previously. Here, "Colored paper A" is designated as the sheet type, and therefore, information "Infeasible" indicating that inspection is difficult is obtained.

Figure 15A:
FIG. 15A and FIG. 15B are each a diagram showing an example of a warning screen.
Figure 15B:
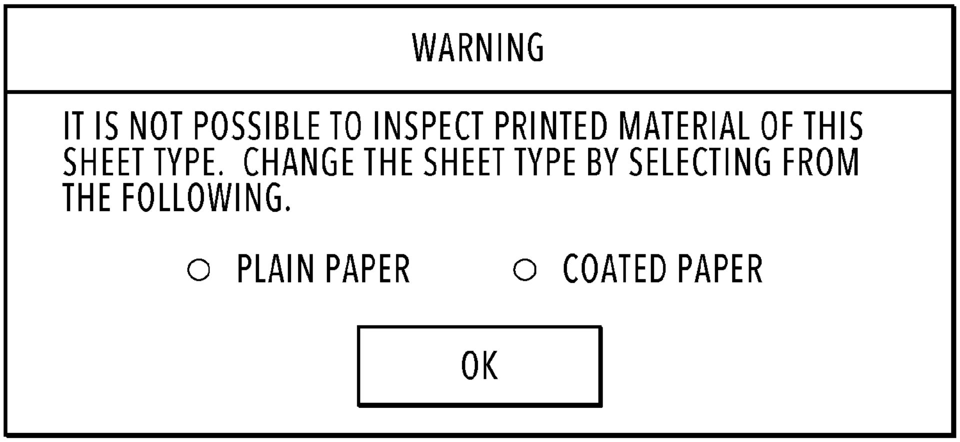

At S1403, the step that is performed next is determined in accordance with the inspection feasibility information obtained at S1402. In a case where the inspection feasibility information obtained at S1402 is "Feasible" indicating that inspection is feasible with no problem, the processing advances to S1404. On the other hand, in a case where the inspection feasibility information is "Infeasible" indicating that inspection is difficult, the processing advances to S1413 and processing to notify a user of a warning to that effect is performed. Specifically, a UI screen including a warning message informing that it is not possible to perform inspection with the designated sheet type is displayed on the UI unit 320. FIG. 15A and FIG. 15B are each an example of a UI screen including a warning message. The contents of the warning in FIG. 15A are those informing that it is not possible to perform inspection with the sheet type designated by a user and prompting the user to change the sheet type. For example, as a UI screen shown in FIG. 15B, it may also be possible to present sheet types for which inspection is feasible with no problem as alternatives and prompt a user to select again a sheet type from among the alternatives. It is sufficient to determine the alternatives in this case with reference to the inspection feasibility information in the lower limit value table in FIG. 13 described previously. By displaying the warning such as this, it is possible for a user to have a chance to reconsider in advance the sheet type.

Each piece of processing at S1404 to S1412 corresponds to that at S1002 to S1010 in the flowchart in FIG. 10 of the first embodiment and there is no difference, and therefore, explanation is omitted. The above is the contents of the inspection processing according to the present embodiment.

As above, according to the present embodiment, in addition to the effects of the first embodiment, in a case where a sheet type for which inspection is difficult is set, it is made possible to notify a user of that and give the user a chance to reconsider the sheet type

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to set an appropriate threshold value for detecting a print defect by taking into consideration a impurity included in a sheet.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-061103, filed Mar. 31, 2021 which are hereby incorporated by reference wherein in its entirety.

What is claimed is:

1. An apparatus for inspecting a read image obtained by reading a printed sheet, the apparatus comprising:

a storage storing a lower limit value for each of a plurality of threshold values for inspection of the read of the printed sheet to be inspected; and a controller, including a processor that executes instructions stored in a memory or including a circuitry, configured to:

calculate, for each contrast value in a designated range of contrast values for a blank-sheet read image obtained by reading a blank sheet of each sheet type including at least a first sheet type and a second sheet type, a maximum size of a pixel group representing a foreign substance included in the blank-sheet read image of the each sheet type;

store in the storage the calculated maximum size as a lower limit value for the each contrast value for the each sheet type;

register a reference image;

inspect the read image of the printed sheet based on at least the registered reference image and an inspection setting related to a set threshold value for the inspection; and apply a different lower limit value to the set threshold value for the inspection depending on a sheet type of the printed sheet.

2. The apparatus according to claim 1, wherein the controller calculates the maximum size, for the each contrast value of the each sheet type, based on an image obtained by performing highlighting processing to highlight the pixel group representing the foreign substance.

3. The apparatus according to claim 1, wherein the controller calculates the maximum size, for the each contrast value of the each sheet type, for each kind of shape of the foreign substance corresponding to an inspection item.

4. The apparatus according to claim 1, wherein:

the threshold value for the inspection is associated with a level of the inspection, and the controller determines whether the set threshold value for the inspection, which is set in accordance with the level selected by a user, is larger than the lower limit value.

5. The apparatus according to claim 4, wherein the controller notifies, in a case where the set threshold value set in accordance with the level selected by the user is not larger than the lower limit value, the user of a warning.

6. The apparatus according to claim 5, wherein the controller notifies for each kind of shape of a foreign substance.

7. The apparatus according to claim 5, wherein contents of the warning include prompting to change the level or prompting to change a sheet type of a sheet used for print processing.

8. The apparatus according to claim 1, wherein:

the storage further stores information indicating whether the inspection is feasible for the each sheet type, the controller determines, based on the information, whether a type of a sheet used for print processing is a type for which the inspection is feasible.

9. The apparatus according to claim 8, wherein the controller generates the information based on a color value representing a base color of the blank-sheet read image of the blank sheet of the each sheet type.

10. The apparatus according to claim 8, wherein:

the threshold value for the inspection is associated with a level of the inspection, the controller determines whether the set threshold value for the inspection, which is set in accordance with the level selected by a user, is larger than the lower limit value, and the controller determines whether a type of a sheet used for the print processing is a type for which the inspection is feasible before the controller determines whether the set threshold value for the inspection set in accordance with the level selected by the user is larger than the lower limit value.

11. The apparatus according to claim 4, wherein the controller performs detection of a defect, using the threshold value determined to be larger than the lower limit value, in the read image obtained by reading of the printed sheet.

12. The apparatus according to claim 11, wherein the controller performs highlighting processing, in accordance with a kind of shape of a foreign substance for the read image of the printed sheet, before performing detection of the defect using the threshold value determined to be larger than the lower limit value.

13. A method of inspecting a read image obtained by reading a printed material sheet, the method comprising:

storing in a storage a lower limit value for each of a plurality of threshold values for inspection of the read image of the printed sheet to be inspected;

calculating, for each contrast value in a designated range of contrast values for a blank-sheet read image obtained by reading a blank sheet of each sheet type including at least a first sheet type and a second sheet type, a maximum size of a pixel group representing a foreign substance included in the blank-sheet read image of the each sheet type;

storing in the storage the calculated maximum size as a lower limit value for the each contrast value for the each sheet type;

registering a reference image;

inspecting the read image of the printed sheet based on at least the registered reference image and an inspection setting related to a set threshold value for the inspection; and applying a different lower limit value to the set threshold value for the inspection depending on a sheet type of the printed sheet.

14. A non-transitory computer readable storage medium storing a program executable by a computer to perform a method of inspecting a read image obtained by reading a printed sheet, the method comprising:
storing in a storage a lower limit value for each of a plurality of threshold values for inspection of the read image of the printed sheet to be inspected;
calculating, for each contrast value in a designated range of contrast values for a blank-sheet read image obtained by reading a blank sheet of each sheet type including at least a first sheet type and a second sheet type, a maximum size of a pixel group representing a foreign substance included in the blank-sheet read image of the each sheet type;
storing in the storage the calculated maximum size as a lower limit value for the each contrast value for the each sheet type;
registering a reference image;
inspecting the read image of the printed sheet based on at least the registered reference image and an inspection setting related to a set threshold value for the inspection; and
applying a different lower limit value to the set threshold value for the inspection depending on a sheet type of the printed sheet.

15. The apparatus according to claim 1, wherein the controller determines whether the read image of the printed sheet includes a defect or not by comparing a difference between the reference image and the read image of the printed sheet with the set threshold value for the inspection.

16. An inspection system comprising:
a printing apparatus that generates a printed sheet; and
an inspection apparatus that inspects a read image obtained by reading the printed sheet, the inspection system comprising:
a storage storing a lower limit value for each of a plurality of threshold values for inspection of the read image of the printed sheet to be inspected; and
a controller, including a processor that executes instructions stored in a memory or including a circuitry, configured to:
calculate, for each contrast value in a designated range of contrast values for a blank-sheet read image obtained by reading a blank sheet of each sheet type including at least a first sheet type and a second sheet type, a maximum size of a pixel group representing a foreign substance included in the blank-sheet read image of the each sheet type;
store in the storage the calculated maximum size as a lower limit value for the each contrast value for the each sheet type;
register a reference image; inspect the read image of the printed sheet based on at least the registered reference image and an inspection setting related to a set threshold value for the inspection; and
apply a different lower limit value to the set threshold value for the inspection depending on a sheet type of the printed sheet.

17. The inspection system according to claim 16, wherein:
the set threshold value for the inspection is associated with a level of the inspection, and
the controller determines whether the set threshold value for the inspection, which is set in accordance with the level selected by a user, is larger than the lower limit value.

18. The inspection system according to claim 17, wherein the controller notifies a user of a warning through a notification interface, in a case where the inspection level selected by the user does not correspond to an inspection level of the sheet type of the printed sheet.

19. The inspection system according to claim 18, wherein the controller further notifies the user through the notification interface for each kind of a shape of a foreign substance.

20. The inspection system according to claim 19, wherein contents of the warning include prompting to change the level of the inspection or prompting to change a sheet type of a sheet used for print processing.

* * * * *